US012587111B2

(12) United States Patent
Shuai et al.

(10) Patent No.: US 12,587,111 B2
(45) Date of Patent: Mar. 24, 2026

(54) QUASI MULTI-LEVEL CONVERTER

(71) Applicant: HUAWEI TECHNOLOGIES CO., LTD., Shenzhen (CN)

(72) Inventors: Peng Shuai, Shenzhen (CN); Chengmin Li, Lausanne (CH); Drazen Dujic, Lausanne (CH)

(73) Assignee: Huawei Technologies Co., Ltd, Shenzhen (CN)

( * ) Notice: Subject to any disclaimer, the term of this patent is extended or adjusted under 35 U.S.C. 154(b) by 191 days.

(21) Appl. No.: 18/507,081

(22) Filed: Nov. 12, 2023

(65) Prior Publication Data

US 2024/0079967 A1 Mar. 7, 2024

Related U.S. Application Data

(63) Continuation of application No. PCT/EP2021/062660, filed on May 12, 2021.

(51) Int. Cl.
 *H02M 7/483* (2007.01)
 *H02M 1/00* (2006.01)
 *H02M 7/5387* (2007.01)

(52) U.S. Cl.
 CPC ....... *H02M 7/4835* (2021.05); *H02M 1/0029* (2021.05); *H02M 1/0095* (2021.05); *H02M 7/53871* (2013.01)

(58) Field of Classification Search
 CPC ............. H02M 7/4835; H02M 1/0029; H02M 1/0095; H02M 7/53871
 See application file for complete search history.

(56) References Cited

U.S. PATENT DOCUMENTS

| | | | |
|---|---|---|---|
| 9,071,165 B2 | 6/2015 | Soua | |
| 10,439,512 B1 * | 10/2019 | Mouridsen | H02J 9/062 |
| 2013/0044526 A1 | 2/2013 | Soua | |
| 2014/0211520 A1 | 7/2014 | Zhang et al. | |
| 2024/0348179 A1 * | 10/2024 | Ebrahimi Jouzdani | |
| | | | H02M 1/0095 |

FOREIGN PATENT DOCUMENTS

WO 2019238443 A1 12/2019

OTHER PUBLICATIONS

Bertoldi et al., "Quasi-Two-Level converter operation strategy for overvoltage mitigation in long cable applications", IEEE International Electric Machines & Drives Conference (IEMDC), pp. 1621-1627 (May 12, 2019).
Gowaid et al., "Analysis and Design of a Modular Multilevel Converter with Trapezoidal Modulation for Medium and High Voltage DC-DC Transformers", IEEE Transactions on Power Electronics, vol. 30, No. 10, total 19 pages (Oct. 1, 2015).

(Continued)

*Primary Examiner* — Adolf D Berhane
(74) *Attorney, Agent, or Firm* — Leydig, Voit & Mayer, Ltd.

(57) ABSTRACT

The present disclosure relates to a quasi-multi-level power converter and a method of operating the same. The power converter is capable of reconciling scalable operation voltage, multiple output voltage levels, controllable voltage rising or decreasing slew rate, and a balance between the high voltage levels and the volume/weight of passive circuit components.

19 Claims, 5 Drawing Sheets

(56) References Cited

OTHER PUBLICATIONS

Yu et al., "Design of a SiC-based Five-Level Stacked Multicell Converter for High-Speed Motor Drives", IEEE Energy Conversion Congress and Exposition (ECCE), pp. 4063-4068 (Sep. 29, 2019).

Li et al., "Systematic Synthesis and Derivation of Multilevel Converters using Common Topological Structures with Unified Matrix Models", IEEE Transactions on Power Electronics, vol. 35, No. 6, total 20 pages (Oct. 21, 2019).

McGrath et al., "Optimal Modulation of Flying Capacitor and Stacked Multicell Converters Using a State Machine Decoder", IEEE Transactions on Power Electronics, vol. 22, No. 2, pp. 508-516 (Mar. 5, 2007).

Liu et al., "An Improved Space Vector Modulation with Capacitor Voltage Control for T-type Five Level Nested Neutral Point Piloted Converter", IEEE Transactions on Power Electronics, vol. 36, No. 5, total 17 pages (Sep. 22, 2020).

Xu et al., "A Novel Hybrid Five-Level Voltage Source Converter Based on T-Type Topology for High-Efficiency Applications", IEEE Transactions on Industry Applications, vol. 53, No. 5, total 14 pages (Sep. 1, 2017).

Gowaid et al., "A DC Autotransformer Design for Medium and High Voltage DC Transmission Systems", IEEE 12th International Conference on Compatibility, Power Electronics and Power Engineering (CPE-POWERENG 2018), total 6 pages (Apr. 10, 2018).

Nava et al., "Stacked Multicell Converter Controlled by DSP", 14th International Conference on Electronics, Communications and Computers, total 6 pages (Feb. 16, 2004).

Sandeep et al., "Simplified Hybrid Nine-Level Stacked Multicell Converter with Reduced Part Count for Grid-Connected Applications", IEEE PES Asia-Pacific Power and Energy Engineering Conference (APPEEC), total 6 pages (Nov. 8, 2017).

Xiao et al., "An Improved Modulation Strategy Combining Phase Shifted PWM and Phase Disposition PWM for Cascaded H-Bridge Inverters", Energies, vol. 10, No. 9, total 14 pages (Sep. 2, 2017).

Gowaid et al., "Quasi Two-Level Operation of Modular Multilevel Converter for Use in a High-Power DC Transformer with DC Fault Isolation capability," IEEE Transactions on Power Electronics, vol. 30, No. 1, total 16 pages (2015).

Milovanovic et al., "Comprehensive Analysis and Design of a Quasi Two-Level Converter Leg," CPSS Transactions on Power Electronics and Applications, vol. 4, No. 3, pp. 181-195 (Sep. 2019).

Gierschner et al., "Quasi-Two-Level Operation of a Five-Level Flying-Capacitor Converter," 2019 21st European Conference on Power Electronics and Applications (EPE '19 ECCE Europe), XP033665682, total 9 pages (Sep. 2019).

Adam et al., "Capacitor Balance Issues of the Diode-Clamped Multilevel Inverter Operated in a Quasi Two-State Mode", IEEE Transactions on Industrial Electronics, vol. 55, No. 8, XP011232121, Total 12 pages (Aug. 2008).

* cited by examiner

QUASI MULTI-LEVEL CONVERTER

CROSS-REFERENCE TO RELATED APPLICATIONS

This application is a continuation of International Application No. PCT/EP2021/062660, filed on May 12, 2021, the disclosure of which is hereby incorporated by reference in its entirety.

TECHNICAL FIELD

The present disclosure relates to electrical power conversion, and in particular to medium voltage (MV) power converters and methods of operating the same.

BACKGROUND

MV power converters are widely adopted in a broad range of applications such as renewable energy generation, supercharging stations, motor drives, etc.

In a wide range of MV applications, increasing load power leads to growing power capacity of the MV converters, resulting in increased current stress of the components and consequently, increased cost. This challenge drives the increase of the rated operating voltage of the MV converters, in order to reduce the current stress of the used components. Therefore, future solutions of MV converters should be capable of handling higher voltages.

Apart from typical specifications such as efficiency and power quality, MV high power converters in emerging applications may have special application-specific requirements. For example, in transportation, high power and lightweight are the core demands. In data centers, high efficiency and low footprint are typically the core requirements. In general, the volume or weight of the passive components of the converters should be reduced as much as possible, which is not commonly emphasized in conventional MV converters due to the low switching frequency of the high voltage power devices. Meanwhile, the passive components such as the filter and the capacitor occupy a large portion of a total size of nowadays MV converter. This originates from the inherent operation principle of these converters, such as large energy storage components for stabilization of the voltage, and greatly limits the design improvements of MV power converters.

Typically, the voltage of MV converters varies from 1kVac to 35kVac and the power ranges from several hundreds of kilo-watts to several mega-watts. When the operating voltage is in the MV range, there are several solutions available.

Two-level converters are widely adopted due to their simple topology and control system. However, the high voltage rated switches are typically required in the two-level converter to block the applied voltage. Currently, the highest rated blocking voltage of the commercially available power devices is only 6.5 kV. Although there are some fully controllable devices with higher blocking voltage under development, such as 10 kV SiC MOSFETs, there is a long way to be commercially adopted in terms of the cost and reliability of the devices. A direct series connection of the power devices is challenging in voltage balancing of the series-connected power devices and extra snubbers may be necessary in real applications. Typically, conventional two-level converters involve large switching losses in semiconductors and large output filters.

Multi-level converters have been widely adopted to increase the voltage and power rating of the converters. In this category, the typically adopted topologies include the neutral point clamped (NPC) converter, T-type converters, etc. The wide application of multilevel converter has successfully pushed the power converters to the higher power and higher voltage rating. However, the maximum voltage is still limited by the voltage of the power devices. As an improvement, in recent years, the modular multi-level converter (MMC) has drawn a wide range of attention. The converter has superior benefits in terms of voltage scalability, high-quality output voltage waveform and low switching frequency for the devices. Although it has achieved great success in high voltage direct-current (DC) power transmission, in MV applications, the main drawback is the relatively high cost and the large volume due to large number of submodule capacitors. As a result, the application is restricted in space limited applications.

Quasi two-level (Q2L) operation, a novel kind of use of MMCs, has been proposed to reduce the volume occupied by the submodule capacitors in MMC. The method has initially been proposed for DC/DC power converters and soon has found its application in AC/DC converters as well. Different from conventional MMC converter operation, the submodule bus capacitors are only inserted for a small period of time. Thus, the energy ripple on the DC bus capacitor is greatly reduced, so does the capacitance of the submodule. However, this topology can only output two voltage levels per phase leg and, unfortunately eliminates the high-quality output voltage waveform of the MMC converter. As a result, a relatively large output filter is typically required to make sure the current total harmonic distortion (THD) meets the specifications.

To overcome this disadvantage, several approaches attempt to combine the conventional multilevel converters with the MMC converters. The general idea is to replace the switch in conventional multilevel converters with a string of half-bridge or full-bridge submodules and optionally with a series-connected branch inductor. These topologies try to combine the benefits of both, the less volume of the capacitors of conventional multilevel converters with the scalable operation voltage of MMC converters. The potential benefits are increased power quality and reduced volume. However, simply replacing the original switch with a branch of the submodules is not enough. Several general considerations on the voltage level scalability and the voltage balancing of the submodule capacitor must be ensured. Typically, a branch inductor is required and a circulating current is adopted to balance the submodule capacitor voltages. And the voltage level may still be not sufficient in some three-level or five-level converter.

SUMMARY

In view of the above-mentioned problems and disadvantages, embodiments of the present disclosure aim to improve a topology and an operation of MV power converters, in order to combine scalable operation voltage, multiple output voltage levels, controllable voltage slope, and a balance between high voltage levels and a volume/weight of passive circuit components.

This objective is achieved by the embodiments described in the enclosed independent claims. Advantageous implementations of the embodiments are further defined in the dependent claims.

A first aspect of the present disclosure relates to a power converter. The power converter comprises at least one phase leg. The at least one phase leg comprises direct-current (DC) terminals connectable to a DC source or load; an alternating-current (AC) terminal connectable to an AC load or source; and at least one module serially connecting the DC and AC terminals of the respective phase leg. The at least one module respectively comprises a first, a second and a third AC terminal; a first, a second and a third DC terminal; capacitive energy storage devices serially connecting the first, second and third DC terminals; at least one first power switch serially connecting the first DC terminal and the first AC terminal; at least one switching cell serially connecting the second DC terminal and the second AC terminal; and at least one third power switch serially connecting the third DC terminal and the third AC terminal. The at least one switching cell respectively comprises at least one energy storage device; and at least one fully controllable second power switch. The first and third DC terminals of a first one of the at least one serially connected module form the DC terminals of the respective phase leg; and the AC terminals of a last one of the at least one serially connected module are connected to one another and form the AC terminal of the respective phase leg.

According to an implementation of the first aspect, the at least one first power switch and the at least one third power switch may respectively be configured for synchronous switching based on first and third drive signals established in accordance with a first pulse-width modulation scheme and in dependence of a predetermined AC voltage modulation waveform; and the at least one switching cell may be configured for asynchronous switching based on second drive signals established in accordance with a second PWM scheme and in dependence of the first and third drive signals.

The power converter may facilitate combining scalable operation voltage and multiple output voltage levels because of modularity, a controllable voltage slope due to the cell-based approach, and a balance between high voltage levels and a volume/weight of passive circuit components.

According to an implementation of the first aspect, the at least one switching cell of the respective module may comprise a H-bridge. The H-bridge comprises two legs, respectively comprising a pair of the second power switches connected anti-serially; a bridge between the two legs, comprising the at least one energy storage device of the at least one switching cell; and adjoining terminals of the two legs connected to form terminals of the at least one switching cell.

This particular topology may facilitate a zero-voltage switching of the at least one first power switch and the at least one third power switch, and may further facilitate a current commutation within the at least one switching cell to reduce a switching loop inductance and to increase a switching speed.

According to an implementation of the first aspect, one of the pairs of the second power switches may comprise main second power switches; and another one of the pairs of the second power switches may comprise auxiliary second power switches having a current rating lower than a current rating of the main second power switches.

The lower current ratings of the auxiliary second power switches may facilitate reducing a cost and size of the power converter.

According to an implementation of the first aspect, the at least one energy storage device of the at least one switching cell of the respective module may comprise a capacitive energy storage device.

When inserted for a small period of time only, the capacitive energy storage device may facilitate reducing a slope of an output voltage.

According to an implementation of the first aspect, the at least one switching cell of the respective module may further comprise a resistive device serially connected to the energy storage device of the at least one switching cell.

According to an implementation of the first aspect, the at least one switching cell of the respective module may further comprise an inductive energy storage device serially connected to one of the terminals of the at least one switching cell The resistive or inductive devices may facilitate preventing oscillations between passive components in the at least one switching cell during switching According to an implementation of the first aspect, the at least one first power switch of the respective module and the at least one third power switch of the respective module may respectively comprise at least one power diode.

The particular topology may facilitate reducing a cost and size of the power converter at the expense of bidirectional operation of the power converter.

According to an implementation of the first aspect, the at least one first power switch of the respective module and the at least one third power switch of the respective module may respectively comprise at least one fully controllable power switch of:

a silicon (Si) insulated gate bipolar transistor (IGBT);

a silicon carbide (SiC) metal-oxide-semiconductor field-effect transistor (MOSFET);

an integrated gate-commutated thyristor (IGCT); and a gallium nitride (GaN) high-electron-mobility transistor (HEMT).

This particular topology may facilitate a bidirectional operation of the power converter.

According to an implementation of the first aspect, the power converter may comprise three phase legs forming respective AC terminals connectable to a three-phase AC load or source.

A second aspect of the present disclosure relates to a method of operating a power converter. The power converter comprises at least one phase leg. The at least one phase leg comprises direct-current (DC) terminals connectable to a DC source or load; an alternating-current (AC) terminal connectable to an AC load or source; and at least one module serially connecting the DC and AC terminals of the respective phase leg. The at least one module respectively comprises a first, a second and a third AC terminal; a first, a second and a third DC terminal; capacitive energy storage devices serially connecting the first, second and third DC terminals; at least one first power switch serially connecting the first DC terminal and the first AC terminal; at least one switching cell serially connecting the second DC terminal and the second AC terminal; and at least one third power switch serially connecting the third DC terminal and the third AC terminal. The at least one switching cell respectively comprises at least one energy storage device; and at least one fully controllable second power switch. The first and third DC terminals of a first one of the at least one serially connected module form the DC terminals of the respective phase leg; and the AC terminals of a last one of the at least one serially connected module are connected to one another and form the AC terminal of the respective phase leg. The method comprises establishing first drive signals of the at least one first power switch of a respective module and third drive signals of the at least one third power switch of the respective module in accordance with a first PWM scheme and in dependence of a predetermined AC voltage modulation waveform; establishing second drive signals of the at least one switching cell of the respective module in accordance with a second PWM scheme and in dependence of the first and third drive signals; synchronously switching the at least one first power switch of the respective module based on the first drive signals; synchronously switching the at least one third power switch of the respective module based on the third drive signals; and asynchronously switching the at least one switching cell of the respective module based on the second drive signals.

The technical effects and advantages mentioned in connection with the power converter of the first aspect similarly apply for the method of the second aspect having corresponding features.

According to an implementation of the second aspect, the first PWM scheme may comprise one of:

sinusoidal PWM (SPWM);

space vector PWM (SVPWM);

phase-shifted (PS) PWM; and phase disposition (PD) PWM.

Deployment of these modulation strategies may facilitate a straightforward implementation of the power converter.

According to an implementation of the second aspect, the first PWM scheme may comprise hybrid PS PD PWM.

Deployment of this modulation strategy may facilitate charging and discharging the capacitive energy storage device evenly in each switching period, and thus reducing a voltage balancing effort.

According to an implementation of the second aspect, asynchronously switching the at least one switching cell of the respective module may comprise switching the at least one switching cell of the respective module complementary to the drive signals of both the at least one first power switch and the at least one third power switch of the respective module.

This may facilitate avoiding a shoot-through condition in the at least one switching cell.

According to an implementation of the second aspect, the at least one switching cell of the respective module may respectively comprise pairs of second power switches connected anti-serially; one of the pairs of the second power switches comprising main second power switches; and another one of the pairs of the second power switches comprising auxiliary second power switches; and asynchronously switching the at least one switching cell of the respective module may comprise switching the main second power switches of the at least one switching cell of the respective module complementary to the at least one first power switch or the at least one third power switch of the respective module having a same voltage blocking direction.

This may facilitate a zero-voltage switching of the at least one first power switch or the at least one third power switch, thus realizing a zero loss turn-on.

According to an implementation of the second aspect, asynchronously switching the at least one switching cell of the respective module may comprise switching the main second power switches of the at least one switching cell of the respective module staggered in time in accordance with respective dwell times.

This may facilitate avoiding a steep slope of the output voltage.

According to an implementation of the second aspect, the method may further comprise adjusting the respective dwell times.

This may facilitate voltage balancing.

According to an implementation of the second aspect, adjusting the respective dwell times may comprise sampling a voltage of the energy storage device; comparing the sampled voltage with a reference voltage; adjusting the respective dwell time so as to increase a discharging time of the energy storage device if the sampled voltage is greater than the reference voltage; and adjusting the respective dwell time so as to increase a charging time of the energy storage device if the sampled voltage is less than the reference voltage.

This may facilitate a voltage balancing of the capacitive energy storage device, and thus ensure safe operation and a balanced power loss among the devices of a switching cell.

According to an implementation of the second aspect, adjusting the respective dwell times may comprise determining a current direction and a voltage deviation direction of the energy storage device, the capacitor current direction defined as positive when the energy storage device is charged by a current upon insertion of the energy storage device between the second terminals of the respective module; adjusting the respective dwell time to a minimum value so as to reduce a total charge of the energy storage device if the current direction is positive and the voltage deviation is positive; and adjusting the respective dwell time to a maximum value so as to increase the total charge of the energy storage device if the current direction is positive and the voltage deviation is negative.

This may facilitate a voltage balancing of the capacitive energy storage device with little information and calculation resource required.

According to an implementation of the second aspect, the method may further comprise switching the main second power switches of the at least one switching cell of the respective module into a configuration bypassing the at least one energy storage device and the auxiliary second power switches.

According to an implementation of the second aspect, the method may further comprise switching the auxiliary second power switches of the at least one switching cell of the respective module into a configuration bypassing the at least one energy storage device and the main second power switches.

These configurations may facilitate increasing a reliability of the converter.

It has to be noted that all means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects will now be described with respect to various embodiments illustrated in the enclosed drawings.

The features of these embodiments may be combined with each other unless specified otherwise.

Figure 1:
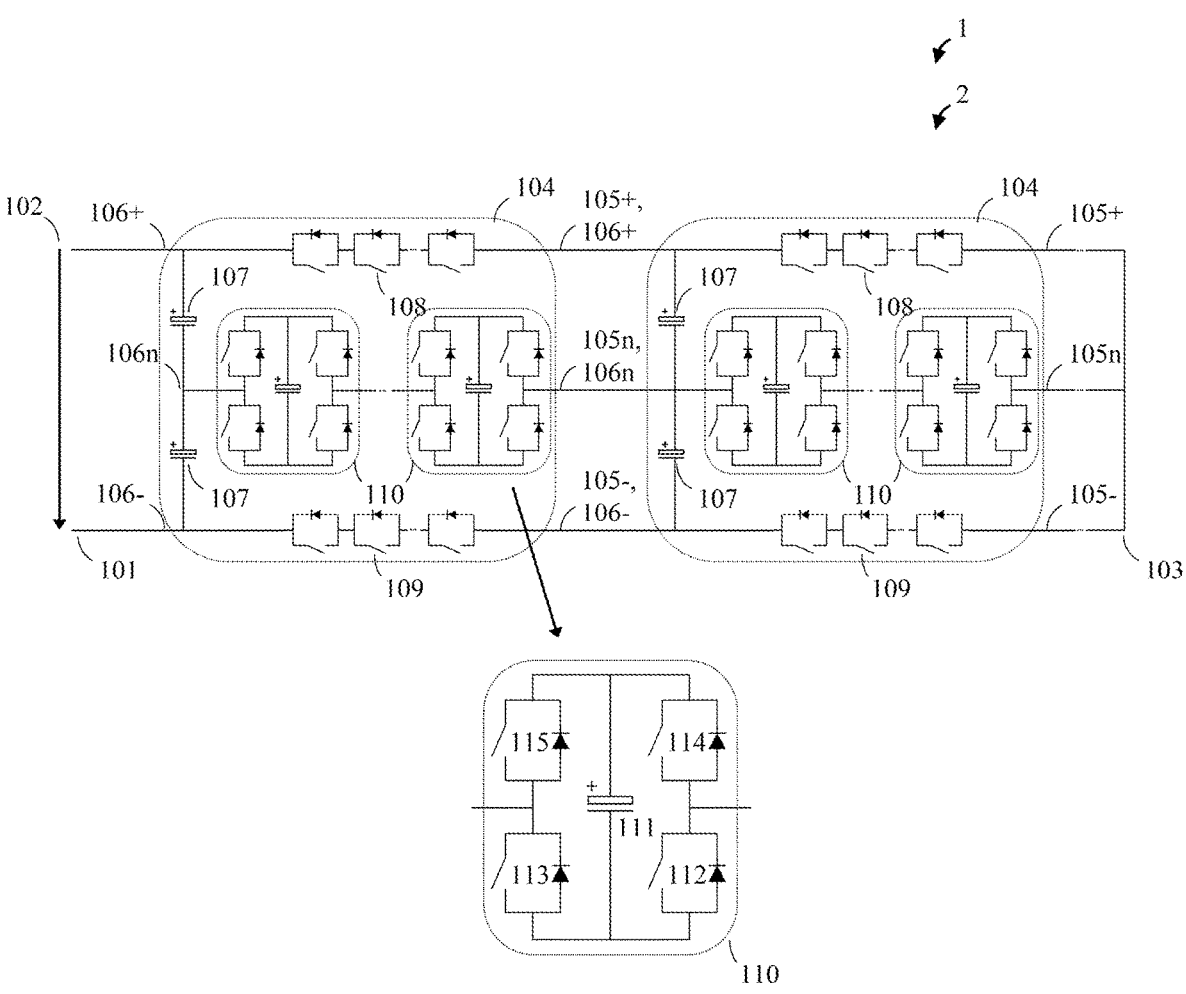

The drawings are to be regarded as being schematic representations and elements illustrated in the drawings are not necessarily shown to scale. Rather, the various elements are represented such that their function and general purpose become apparent to a person skilled in the art.

Figure 2:
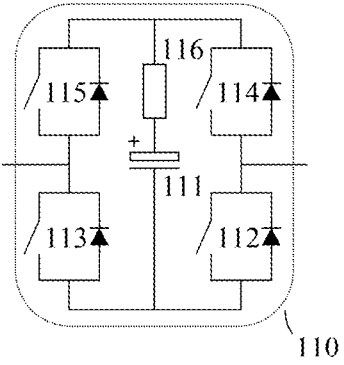
Figure 3:
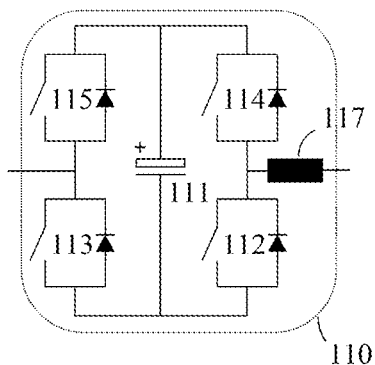
Figure 4:
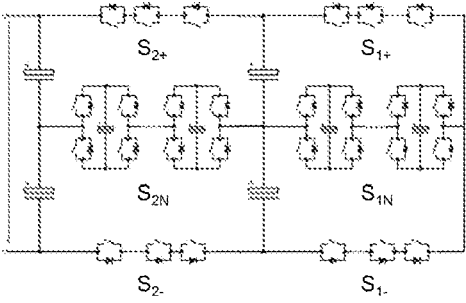
Figure 5:
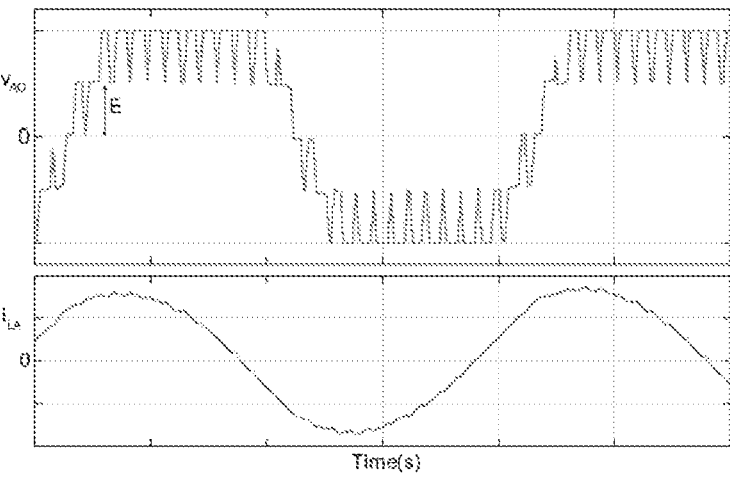
Figure 6:
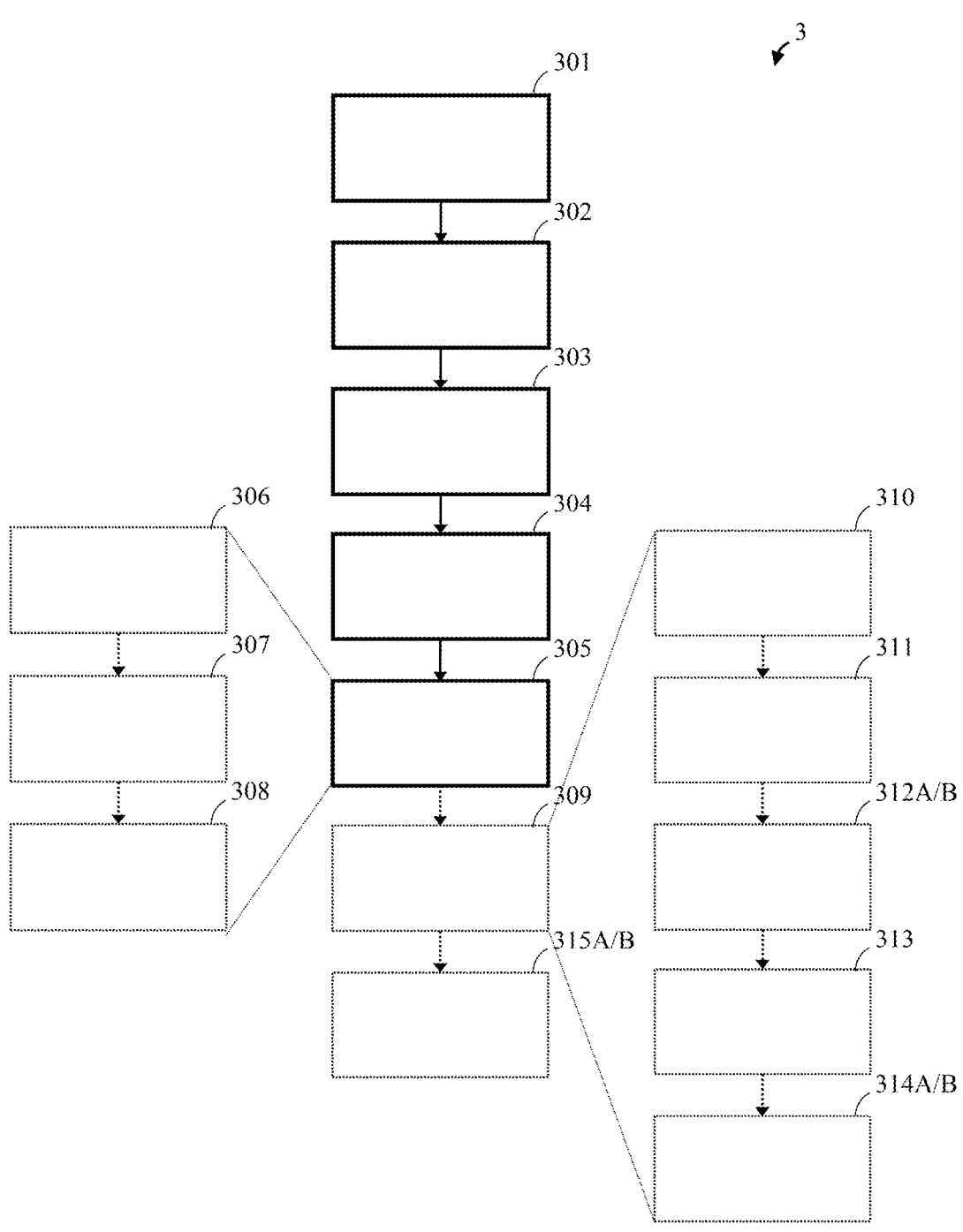
Figure 7:
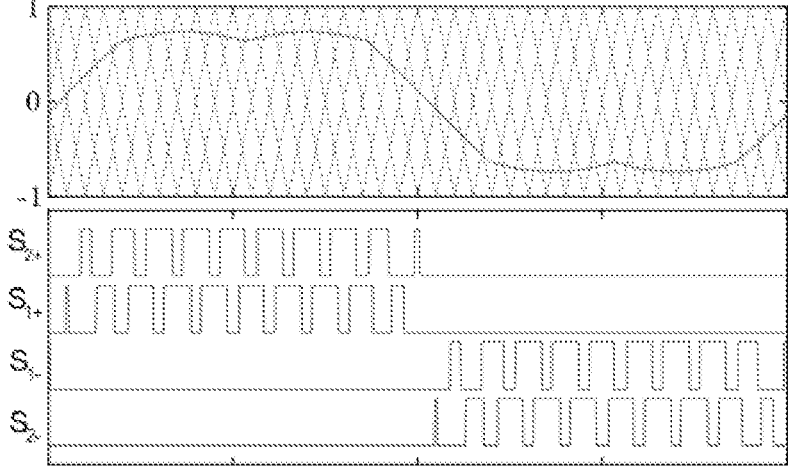
Figure 8:
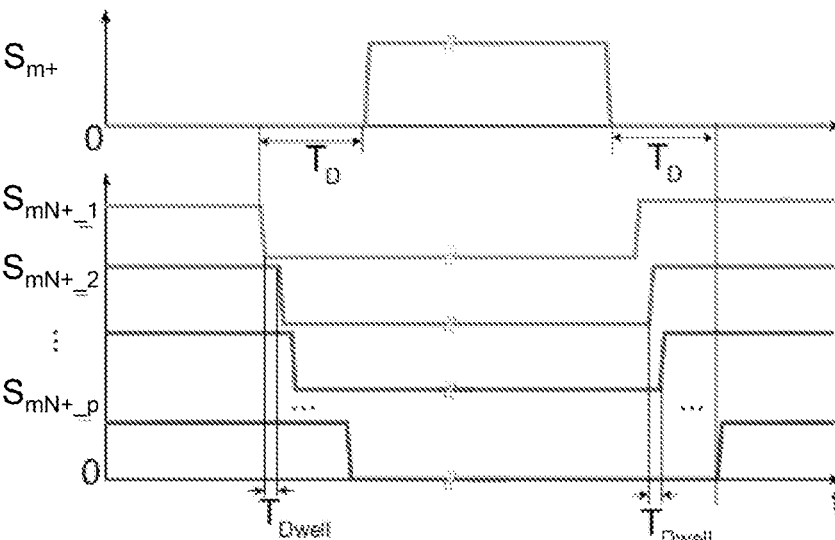

FIG. 1 illustrates a power converter according to an embodiment of the present disclosure;

FIGS. 2 and 3 respectively illustrate alternative switching cells of a module of the power converter of FIG. 1;

FIG. 4 illustrates the power converter of FIG. 1 comprising M=2 modules;

FIG. 5 illustrates, in an upper part, 2M+1=5 AC output voltage levels achieved by the power converter of FIG. 4, and in a lower part, a resulting sinusoidal AC output current smoothed by an inductive load;

FIG. 6 illustrates a flow diagram of a method of operating the power converter of FIG. 1;

FIG. 7 illustrates, in an upper part, a comparison between phase-shifted carrier waveforms and a predetermined AC voltage modulation waveform, and in a lower part, examples of resulting drive signals for first and third arms of the respective module 104, m; and FIG. 8 illustrates examples of drive signals of for a second neutral point clamped (NPC) arm of the respective module 104, m.

DETAILED DESCRIPTION OF EMBODIMENTS

FIG. 1 illustrates a power converter 1 according to an embodiment of the present disclosure.

A power converter as used herein may refer to an apparatus that is capable of converting electric energy from one form to another, such as converting between AC and DC.

The power converter 1 of FIG. 1 comprises a single phase leg 2 for the sake of clarity, but may generally comprise at least one phase leg 2.

The at least one phase leg 2 comprises DC terminals 101 connectable to a DC source 102 (see left side of FIG. 1) or load, and an AC terminal 103 connectable to an AC load (see right side of FIG. 1) or source. Therebetween, the at least one phase leg 2 further comprises at least one module 104, m (i.e., 1≤m≤5M) serially connecting the DC and AC terminals 101, 103 of the respective phase leg 2.

Although the power converter 1 may generally be operated in a DC-to-AC or AC-to-DC manner, it will be explained in the following with a focus on operation as a DC-to-AC converter.

The at least one module 104, m respectively comprises: first 105+, second 105n and third 105− AC terminals (see right side of each module 104 in FIG. 1), and first 106+, second 106n and third 106− DC terminals (see left side of each module 104 in FIG. 1). The first 106+ and third 106− DC terminals of a first one of the at least one serially connected module 104, m form the DC terminals 101 of the respective phase leg 2 (see left side of FIG. 1); and the AC terminals 105+, 105n, 105− of a last one of the at least one serially connected module 104, m are connected to one another and form the AC terminal 103 of the respective phase leg 2 (see right side of FIG. 1).

The at least one module 104, m respectively further comprises: capacitive energy storage devices 107, $C_{bus}$ (a.k.a. bus capacitor) serially connecting the first 106+, second 106n and third 106− DC terminals (see left side of each module 104 in FIG. 1); at least one (i.e., 1≤n≤N) first power switch 108, $S_{m+}$ serially connecting the first DC terminal 106+ and the first AC terminal 105+(see upper side of each module 104 in FIG. 1); at least one (i.e., 1≤p≤P, where P=⌈N/2⌉ switching cell 110, $S_{mN}$ serially connecting the second DC terminal 106n and the second AC terminal 105n (see middle part of each module 104 in FIG. 1); and at least one (i.e., 1≤n≤N) third power switch 109, $S_{m−}$ serially connecting the third DC terminal 106− and the third AC terminal 105− (see lower side of each module 104 in FIG. 1).

A power switch as used herein may refer to an active power electronic switch that is designed for high-voltage and/or high-current applications. In particular, power switches may comprise power semiconductor devices.

The capacitive energy storage devices 107, $C_{bus}$ are similar to those of NPC converters and stabilize the second DC terminal 106n to an electric potential at a mid-point between the electric potentials of the first 106+ and third 106− DC terminals.

The at least one first power switch 108, $S_{m+}$ and the at least one third power switch 109, $S_{m−}$ are respectively configured for synchronous switching based on first and third drive signals established in accordance with a first pulse-width modulation PWM scheme and in dependence of a predetermined AC voltage modulation waveform. The at least one switching cell 110, $S_{mN}$ is configured for asynchronous switching based on second drive signals established in accordance with a second PWM scheme and in dependence of the first and third drive signals.

PWM as used herein may refer to a particular drive mode of active power electronic switches involving a turn on/off operation.

Structurally, the at least one phase leg 2 of the power converter 1 may be described by three hierarchical levels, including a module level, an arm level and a switching cell level. The at least one module 104, m comprises three arms, one between each pair of the DC terminals 106+, 106n, 106− and AC terminals 105+, 105n, 105−. Each arm may act as an output voltage level selection switch, using the at least one first power switch 108, $S_{m+}$ in a first arm, the at least one switching cell 110, $S_{mN}$ in a second (NPC) arm, and the at least one third power switch 109, $S_{m−}$ in a third arm.

A number of output voltage levels of the power converter 1 is proportional to a quantity M of modules: A single module may output three voltage levels. For M modules, 2M+1 voltage levels may be generated in one phase leg 2 and as a result, the harmonic contents in the output voltage can be adjusted as needed. The cost of more output voltage levels is that a relatively complex control system is typically required to generate the switching signals for the switches.

A blocking voltage present between the first and third arm is a DC bus voltage $V_{DC}$. A blocking voltage of the switching cells is half of the DC bus voltage $V_{DC}$. As such, the quantity N of series-connected devices as well as the quantity P of switching cells is a design choice depending on the blocking voltages.

For bidirectional operation, the at least one first power switch 108, $S_{m+}$ of the respective module 104, m and the at least one third power switch 109, $S_{m−}$ of the respective module 104, m may respectively comprise at least one fully controllable power switch of: a Si IGBT; a SiC MOSFET; an IGCT; and a GaN HEMT.

For unidirectional operation, such as in power factor correction (PFC) applications, the at least one first power switch 108, $S_{m+}$ of the respective module 104, m and the at least one third power switch 109, $S_{m−}$ of the respective module 104, m may respectively comprise at least one power diode. Typically, the first and third arms respectively comprise series of diodes in this case.

The at least one switching cell 110, $S_{mN}$ may respectively comprise: at least one energy storage device 111, $C_{cell}$, which may comprise a capacitive energy storage device (a.k.a. cell capacitor); and at least one fully controllable second power switch 112, $S_{mN+\_p'}$; 113, $S_{mN-\_p'}$; 114, $S_{mN+\_p'}$; 115, $S_{mN-\_p'}$.

With reference to the enlarged detail of FIG. 1, the at least one switching cell 110, $S_{mN}$ of the respective module 104, m may comprise a H-bridge (full bridge). Two legs of the H-bridge respectively comprise a pair of the second power switches 112, $S_{mN+\_p'}$; 113, $S_{mN-\_p}$ and 114, $S_{mN+\_p'}$; 115, $S_{mN-\_p'}$ connected anti-serially. A bridge between the two legs comprises the at least one energy storage device 111, $C_{cell}$ of the at least one switching cell 110, $S_{mN}$. Adjoining terminals of the two legs are connected to form terminals of the at least one switching cell 110, $S_{mN}$.

One of the pairs of the second power switches 112, $S_{mN+\_p'}$; 113, $S_{mN-\_p'}$; 114, $S_{mN+\_p}$115, $S_{mN-\_p'}$ may comprise main second power switches 112, $S_{mN+\_p'}$; 113, $S_{mN-\_p'}$; and another one of the pairs of the second power switches 112, $S_{mN+\_p'}$; 113, $S_{mN-\_p'}$; 114, $S_{mN+\_p'}$; 115, $S_{mN-\_p'}$ may comprise clamping/auxiliary second power switches 114, $S_{mN+\_p'}$; 115, $S_{mN+\_p'}$ having a current rating lower than a current rating of the main second power switches 112, $S_{mN+\_p'}$; 113, $S_{mN-\_p}$.

In other words, the at least one switching cell 110, $S_{mN}$ of the respective module 104, m comprises a full-bridge circuit including the cell capacitor 111, $C_{cell}$. Conventionally, the voltage and current rating of the second power switches 112, $S_{mN+\_p}$; 113, $S_{mN-\_p}$; 114, $S_{mN+\_p'}$; 115, $S_{mN-\_p'}$ of the full-bridge are all the same due to an even loss distribution among these devices. However, in accordance with the present disclosure, the cell capacitor 111, $C_{cell}$ of the respective switching cell 110, $S_{mN}$ is inserted for a small period of time only, in order to reduce the slope dv/dt of the output AC voltage.

The main second power switches 112, $S_{mN+\_p'}$; 113, $S_{mN-\_p}$ of the full-bridge circuit may be viewed as one switch with a bidirectional voltage blocking capability, the concept being similar to conventional T-type converters. The clamping/auxiliary second power switches 114, $S_{mN+\_p}$; 115, $S_{mN-\_p'}$ may be selected with much lower current ratings, in accordance with a dwell-time of the module. In such a configuration, the clamping/auxiliary second power switches 114, $S_{mN+\_p'}$; 115, $S_{mN-\_p'}$ and the cell capacitor 111, $C_{cell}$ act as an active snubber for the main second power switches 112, $S_{mN+\_p'}$; 113, $S_{mN-\_p}$.

FIGS. 2 and 3 respectively illustrate alternative switching cells 110, $S_{mN}$ of a module 104, m of the power converter 1 of FIG. 1.

These alternative switching cells 110, $S_{mN}$ may prevent oscillations between passive components in the switching cell 110, $S_{mN}$ during switching.

In the embodiment of FIG. 2, the at least one switching cell 110, $S_{mN}$ of the respective module 104, m may further comprise a resistive device 116, R serially connected to the energy storage device 111, $C_{cell}$ of the at least one switching cell 110, $S_{mN}$. The series-connected resistor 116, R is added to the cell capacitor 111, $C_{cell}$ to offer damping to the resonant circuit.

In the embodiment of FIG. 3, the at least one switching cell 110, $S_{mN}$ of the respective module 104, m may further comprise an inductive energy storage device 117, L serially connected to one of the terminals of the at least one switching cell 110, $S_{mN}$. That is to say, an extra inductor 117, L is added to the switching cell 110, $S_{mN}$ to prevent the possible oscillations.

Apart from the specific design of the switching cells 110, $S_{mN}$ in the second arm of the respective module 104, m, the switching cells 110, $S_{mN}$ offer more functionalities and improve the performance of the power converter 1. Firstly, the second arm has a bidirectional voltage blocking capability that can adjust the output voltage level actively, which is the same as the conventional bidirectional devices. Secondly, the at least one energy storage device 111, $C_{cell}$ of the respective switching cell 110, $S_{mN}$ facilitates a temporary support of the output voltage of the phase leg.

Several benefits may be achieved by proper assignment of drive signals, including zero-voltage switching (ZVS) of the at least one first power switch 108, $S_{m+}$ and the at least one third power switch 109, $S_{m-}$ of the respective module 104, m, and a trapezoidal shape output voltage waveform. On the one hand, since ZVS of series-connected power switches can be ensured, the at least one energy storage device 111, $C_{cell}$ of the respective switching cell 110, $S_{mN}$ may be dimensioned relatively large to balance a voltage sharing without increasing a switching loss. On the other hand, the reduced slope dv/dt of the output AC voltage significantly reduces electrical stress for inductive AC loads. For example, the allowable dv/dt of motors or inductors is always limited due to limits of applied insulation design of windings.

The power converter 1 of FIG. 1 may be identified as a quasi-multi-level (QML) converter. The converter concept achieves multiple output voltage levels with controllable voltage slope.

Even though FIG. 1 merely illustrates one phase leg 2, the power converter 1 may comprise three phase legs 2 forming respective AC terminals 103 connectable to a three-phase AC load or source, in particular an inductive AC load. With the help of the multilevel output voltage waveform, relatively small inductances are enough to let the output current satisfy the THD specifications (see FIG. 5, lower part). And since the dv/dt of the output voltage is controlled, the insulation stress on the inductor can be reduced.

A THD as used herein may refer to a figure of merit of electric waveform purity.

In addition, if more than one leg 2 is present, those modules 104, m of the three phase legs 2 connected to the DC source 102 or load may share one common DC bus to reduce a number of DC bus capacitors 107, $C_{bus}$.

This converter configuration can be widely applied to various applications such as grid-connected converter and motor drives. Compared with MMC, it has less DC bus capacitors 107, $C_{bus}$ and less power devices. Compared with conventional multilevel converters, switching the series connection of power devices under hard switching conditions is avoided, and flexible scalability for voltage is obtained. Conventional control methods of MV converters can be directly leveraged.

As an example, FIG. 4 illustrates a power converter 1 comprising M=2 modules, and FIG. 5 (upper part) illustrates the 2M+1=5 output voltage levels thus achieved. On closer inspection of FIG. 5 (upper part), it may be noticed that the edges between the output voltage levels are not vertically sloping but have a reduced slope dv/dt. FIG. 5 (lower part) illustrates the resulting sinusoidal output current smoothed by an inductive load.

A voltage level is thus configurable and an operation voltage of the converter is scalable.

FIG. 6 illustrates a flow diagram of a method 3 of operating the power converter 1 of FIG. 1.

With respect to the topology/structure of the power converter 1, reference is made to its definition in connection with FIG. 1.

The method 3 comprises a step of establishing 301 first drive signals of the at least one first power switch 108, $S_{m+}$ of a respective module 104, m and third drive signals of the at least one third power switch 108, $S_{m+}$ of the respective module 104, m in accordance with a first PWM scheme and in dependence of a predetermined AC voltage modulation waveform.

The method 3 further comprises a step of establishing 302 second drive signals of the at least one switching cell 110, $S_{mN}$ of the respective module 104, m in accordance with a second PWM scheme and in dependence of the first and third drive signals.

The method 3 further comprises a step of synchronously switching 303 the at least one first power switch 108, $S_{m+}$ of the respective module 104, m based on the first drive signals.

The method 3 further comprises a step of synchronously switching 304 the at least one third power switch 109, $S_{m-}$ of the respective module 104, m based on the third drive signals.

The method 3 further comprises a step of asynchronously switching 305 the at least one switching cell 110, $S_{mN}$ of the respective module 104, m based on the second drive signals.

The power converter 1 may be operated based on a proper modulation scheme. For the power converter 1 with M modules, conventional modulation strategies can be directly leveraged. In other words, the first PWM scheme may comprise one of:

sinusoidal PWM (SPWM);
space vector PWM (SVPWM);
phase-shifted (PS) PWM; and
phase disposition (PD) PWM.

Alternatively, the first PWM scheme may comprise hybrid PS PD PWM. In order to generate the switching signals for the power switches in accordance with this scheme, M phase-shifted carrier waveforms are defined for each of the first arm and the third arm of the considered module 104, m. In connection with the exemplary power converter 1 of FIG. 4, the drive signals for the at least one first power switch 108, $S_{m+}$ and the at least one third power switch 109, $S_{m-}$ of the respective module 104, m are generated from a comparison between the corresponding carrier waveforms and the predetermined AC voltage modulation waveform, as is illustrated in FIG. 7 (upper part). Following the proposed strategy, M=2 carrier waveforms with 260°/M=180° phase shift are defined for each of the first arm and the third arm. The predetermined AC voltage modulation waveform shown in FIG. 7 (upper part) is an example of a sinusoidal waveform with third-order harmonic voltage injection to increase a DC bus voltage utilization ratio. Each of the at least one first power switch 108, $S_{m+}$ is turned on or turned off at the same time. Likewise, each of the at least one third power switch 109, $S_{m-}$ is turned on or turned off at the same time. When the modulation voltage is above zero, the at least one first power switch 108, $S_{2+}$ and 108, $S_{1+}$ are in a high frequency switching state, while the at least one third power switch 109, $S_{2-}$ and 109, $S_{1+}$ are in the off state (see FIG. 7, lower part). When the modulation voltage is below zero, the at least one third power switch 109, $S_{2-}$ and 109, $S_{1-}$ is in the high frequency switching state, while the at least one first power switch 108, $S_{2+}$ and 108, $S_{1-}$ keep in the off state.

A harmonic frequency component (or harmonic) as used herein may refer to a frequency of a periodic waveform that is a positive integer multiple of the fundamental (i.e., that is a member of the harmonic series). A fundamental frequency component (or fundamental) as used herein may refer to a lowest frequency of a periodic waveform.

When the modulation voltage is close to zero, there are two possible paths. The first one is that the at least one first power switch 108, $S_{2+}$ and the at least one switching cell 110, $S_{1N}$ are turned on, and the upper DC bus capacitor 107, $C_{bus}$ of the last module m=1 is charged by the output current (assuming that the output current is positive). The second case is that the at least one first power switch 108, $S_{1+}$ and the at least one switching cell 110, $S_{2N}$ are turned on, and the upper DC bus capacitor 107, $C_{bus}$ of the last module m=1 is discharged by the output current. The proposed method ensures the DC bus capacitor 107, $C_{bus}$ is charged and discharged with the same time, thus the capacitor voltage is balanced under ideal conditions. Accordingly, due to PSPD modulation, the capacitive energy storage devices 107, $C_{bus}$ in each module are charged and discharged evenly in one switching period and a voltage balance effort can be reduced.

The second arm represents the current path for the zero-output voltage level and temporarily supports the leg output voltage.

To control the power devices in the switching cell, several considerations must be taken care of. Firstly, from an external point of view, the Second arm should be able to output a trapezoidal voltage waveform. Secondly, the output voltage of the Second arm should be complementary to the first and third arm to avoid inrush current due to a direct parallel connection of the DC bus capacitor 107, $C_{bus}$. If these two conditions are satisfied, the NPC leg can work properly.

The drive signals of the main second power switches 112, $S_{mN+\_p}$; 113, $S_{mN-\_p}$ may be complementary to the drive signals of both the first and the third arm to avoid a shoot-through of the DC link.

As such, asynchronously switching 305 the at least one switching cell 110, $S_{mN}$ of the respective module 104, m may comprise, in accordance with FIG. 6: switching 306 the at least one switching cell 110, $S_{mN}$ of the respective module 104, m complementary to the drive signals of both the at least one first power switch 108, $S_{m+}$ and the at least one third power switch 109, $S_{m+}$ of the respective module 104, m.

Asynchronously switching 305 the at least one switching cell 110, $S_{mN}$ of the respective module 104, m may comprise, in accordance with FIG. 6: switching 307 the main second power switches 112, $S_{mN+\_p}$; 113, $S_{mN-\_p}$ of the at least one switching cell 110, $S_{mN}$ of the respective module 104, m complementary to the at least one first power switch 108, $S_{m+}$ or the at least one third power switch 109, $S_{m-}$ of the respective module 104, m having a same voltage blocking direction. In this embodiment, the at least one switching cell 110, $S_{mN}$ of the respective module 104, m comprises pairs of second power switches 112, $S_{mN+\_p}$; 113, $S_{mN-\_p}$; 114, $S_{mN+\_p}$; 115, $S_{mN-\_p}$, connected anti-serially. One of the pairs of the second power switches 112. $S_{mN+\_p}$; 113. $S_{mN-\_p}$; 114, $S_{mN+\_p}$; 115. $S_{mN-\_p}$, comprises main second power switches 112, $S_{mN+\_p}$; 113, $S_{mN-\_p}$; and another one of the pairs of the second power switches 112. $S_{mN+\_p}$; 113, $S_{mN-\_p}$; 114, $S_{mN+\_p}$; 115. $S_{mN-\_p}$ comprises auxiliary second power switches 114, $S_{mN-\_p}$; 115, $S_{mN-\_p}$.

The drive signals of the at least one switching cell 110, $S_{mN}$ may directly be generated by the drive signals of the first and third arm, in particular by a logical AND combination of the drive signals of the first and third arm. It can be seen that there exists a degree of freedom in assigning the drive signals to the power switches in the switching cells. There are numerous possible combinations of the switching pattern for the devices in the at least one switching cell 110, $S_{mN}$ to achieve this. It also demonstrates that the proposed converter topology has flexible control freedom for other purposes such as loss balancing or active thermal control.

In connection with the exemplary power converter 1 of FIG. 4, the drive signals for the at least one first power switch 108, $S_{m+}$ and the at least one third power switch 109, $S_{m-}$ of the respective module 104, m are generated from a comparison between the corresponding carrier waveforms and the predetermined AC voltage modulation waveform, as is illustrated in FIG. 7 (lower part), as previously mentioned.

In accordance with FIG. 6, asynchronously switching 305 the at least one switching cell 110, $S_{mN}$ of the respective module 104, m may comprise: switching 308 the main second power switches 112, $S_{mN+\_p}$; 113, $S_{mN-\_p}$ of the at least one switching cell 110, $S_{mN}$ of the respective module 104, m staggered in time in accordance with respective dwell times.

FIG. 8 illustrates examples of drive signals of main second power switches 112, $S_{mN+\_p}$, to $S_{mN+\_p}$, of the at least one switching cell 110, $S_{mN}$ of the at least one module 104, m. Before turn-on of the at least one first power switch 108, $S_{m+}$ of the first arm, the main switches $S_{mN+\_1}$ to $S_{mN+\_p}$ orderly turn off with a time delay $T_{Dwell}$ with respect to one other. After the turn-off of the at least one first power switch 108, $S_{m+}$ the first arm, the main second power switches 112, $S_{mN-\_1}$ to $S_{mN+\_p}$ are turned on orderly with a time delay $T_{Dwell}$ with respect to each other. During the turn on and off between at least one first power switch 108, $S_{m+}$ of the first arm and the main second power switches 112, $S_{mN+\_p}$ in the Second arm, a period of dead time $T_D$ is provided to satisfy the condition $T_D > p \cdot T_{Dwell}$. In each leg of the full-bridge of the at least one switching cell 110, $S_{mN}$, the drive signals of the clamping/auxiliary second power switches 114, $S_{mN+\_p}$; 115, $S_{mN-\_p}$, and the main second power switch 112, $S_{mN+\_p}$, are complementary, with a short period of dead time inserted. With the proposed gate driving strategy of the power devices, one phase leg can output 2M+1 voltage levels and a transition between two adjunct output voltage levels is defined by the dwell time and the quantity P of the at least one switching cell 110, $S_{mN}$.

With the proposed topology and the modulation strategy, superior THD of the phase output voltage can be achieved, and a reduced voltage slope during the transition of the output voltage level is beneficial for insulation loss reduction of the filters.

Another benefit is switching loss reduction of the first power switches 108, $S_{m+}$ and the third power switches 109, $S_{m-}$ where directly series-connected power devices are adopted. In typical industrial solutions, a parallel-connected snubber, typically a resistor-capacitor (RC) snubber, is necessary for dynamic voltage balancing of the series-connected devices. The RC snubber increases the switching loss in hard switching conditions. With the proposed operating method, before the switching of the first or third arm, the Second arm builds the DC output voltage firstly. Thus, zero voltage turn-on of the first power switches 108, $S_{m+}$ and the third power switches 109, $S_{m-}$ is achieved. With this configuration, the hard-switching stress is transferred to the devices in the at least one switching cell 110, $S_{mN}$. Since the current commutating inside the respective switching cell 110, $S_{mN}$ occurs between the main second power switch 112, $S_{mN+\_p}$; 113, $S_{mN-\_p}$ and the clamping/auxiliary second power switch 114, $S_{mN+\_p}$; 115, $S_{mN-\_p}$, it is possible to reduce the switching loop inductance to increase the switching speed. This is beneficial for an application of next-generation wide-bandgap (WBG) power devices integrated into the at least one switching cell 110, $S_{mN}$. To reduce the cost as well as the number of series-connected devices, the first power switches 108, $S_{m+}$ and the third power switches 109, $S_{m-}$ can be high voltage IGBTs or IGCTs. Widely adopted press-pack packages can be adopted in the series connection.

To ensure safe operation and achieve balanced power loss among the power devices of the at least one switching cell 110, $S_{mN}$, voltage balancing of the cell capacitor 111, $C_{cell}$ is of vital importance. Ideally, the cell capacitor 111, $C_{cell}$ is charged (positive output current) or discharged (negative output current) with the same time, and the voltage is balanced for all the cell capacitors 111, $C_{cell}$. However, due to parameter variation of the components and mismatch of gate driving signals, there will be a voltage imbalance among the cell capacitors of the at least one switching cell 110, $S_{mN}$ in reality. The voltage imbalance can be eliminated by careful device selection and optimized layout of the at least one switching cell 110, $S_{mN}$. However, if the voltage imbalance exceeds a certain limit, active voltage balancing is provided to adjust a voltage across the cell capacitor 111, $C_{cell}$ of the at least one switching cell 110, $S_{mN}$ dynamically. Since the charging and discharging of the cell capacitor 111, $C_{cell}$ is controlled by the duration of the dwell-time, the dwell-time is adopted as the control freedom to compensate the voltage imbalance.

The method 3 may thus further comprise, in accordance with FIG. 6: adjusting 309 the respective dwell times.

Following this strategy, the voltage across the cell capacitor 111, $C_{cell}$ is sampled and compared with a reference voltage, which is the expected voltage under ideal balanced condition. If the voltage of one submodule is larger than the reference voltage, the dwell-time is adjusted that the charging time of the cell capacitor 111, $C_{cell}$ is increased. If the voltage of one submodule is smaller than the reference voltage, the discharging time of the cell capacitor 111, $C_{cell}$ is increased. To generate the dwell-time, the closed-loop controller can be a PI (proportional-integral) controller or any other type of controllers.

That is to say, adjusting 309 the respective dwell times may comprise, in accordance with FIG. 6: a step of sampling 310 a voltage of the energy storage device 111, $C_{cell}$; a step of comparing 311 the sampled voltage with a reference voltage; and a step of either: adjusting 312A the respective dwell time so as to increase a discharging time of the energy storage device 111, $C_{cell}$ if the sampled voltage is greater than the reference voltage; or: adjusting 312B the respective dwell time so as to increase a charging time of the energy storage device 111, $C_{cell}$ if the sampled voltage is less than the reference voltage.

In one embodiment of the voltage balancing, a direction of the bus voltage deviation in the cell capacitor 111, $C_{cell}$ and a direction of the load current is adopted as the reference information to control the dwell-time. Firstly, the voltages of the p switching cells $(V_1, V_2 \ldots, V_p)$ are sampled. Then an average voltage is selected as the reference voltage under ideal balanced conditions. The bus voltage deviation is defined by $\Delta V_i = E/N - V_i$, where E is half of a voltage of the DC bus capacitor 107, $C_{bus}$ the module 104, m (see FIG. 5, upper part). The charging or discharging current of the capacitor is defined as L. If the DC bus capacitor 107, $C_{bus}$ is charged when the cell capacitor 111, $C_{cell}$ is inserted, L is positive. If $\Delta V_i$ $I_i > 0$, the capacitor voltage is larger than the reference value and the capacitor is still being charged. Therefore, it may be necessary to reduce the charging time of the DC bus capacitor 107, $C_{bus}$. In this case, reducing the dwell-time to reduce the charge flow to the DC bus capacitor 107, $C_{bus}$ is beneficial. Thus, the dwell-time is set to the minimum value $T_{d\_min}$. If $\Delta V_i I_i < 0$, which means the capacitor voltage is smaller than the desired value, and the capacitor is charged, the dwell-time is set to the maximum value $T_{d\_max}$ to increase the charge flow to the DC bus capacitor 107, $C_{bus}$. Under this scheme, the capacitor voltage can remain at a dynamically balanced state.

In other words, adjusting 309 the respective dwell times may comprise, in accordance with FIG. 6: a step of determining 313 a current direction and a voltage deviation direction of the energy storage device 111, $C_{cell}$, wherein the capacitor current direction is defined as positive when the energy storage device 111, $C_{cell}$ is charged by a current upon insertion of the energy storage device 111, $C_{cell}$ between the second terminals 106n, 105n of the respective module 104, m; and a step of either: adjusting 314A the respective dwell time to a minimum value so as to reduce a total charge of the energy storage device 111, $C_{cell}$ if the current direction is positive and the voltage deviation is positive; or: adjusting 314B the respective dwell time to a maximum value so as to increase the total charge of the energy storage device 111, $C_{cell}$ if the current direction is positive and the voltage deviation is negative.

To increase a reliability of power converters, a redundant design with respect to their weakest components is the commonly adopted strategy. If one component fails, the redundant parts ensure a regular or derating operation of the converter. On a switching cell level, an N+M redundancy may be applied in the power converter 1. In N+M cascaded switching cells, N cells are enough to support the DC bus voltage and M cells are provided as redundant cells. If one or more components fail in the switching cell, the switching cell may be bypassed. Considering that the main second power switches 112, $S_{mN+\_p}$; 113, $S_{mN-\_p}$ and the clamping/auxiliary secondary power switches 114, $S_{mN+\_p}$; 115, $S_{mN-\_p}$, respectively act as bidirectional switches, the devices can be adopted to bypass the switching cell if a failure occurs. Depending on the failure mode, when the components except for the main second power switches in one switching cell fail, the main secondary power switches are permanently turned on to bypass the at least one switching cell 110, $S_{mN}$. This procedure works unless M switching cells are bypassed. If one of the main second power switches 112, $S_{mN+\_p}$; 113, $S_{mN-\_p}$, fails to open circuit, the clamping/auxiliary second power switches 114, $S_{mN-\_p}$; 115, $S_{mN-\_p}$ in the full bridge circuit will be permanently turned on to bypass the switching cell. This method ensures that phase leg remains operable when the failure occurs in the switching cell.

So the method 3 may further comprise, in accordance with FIG. 6, a step of either: switching 315A the main second power switches 112, $S_{mN+\_p}$; 113, $S_{mN-\_p}$ of the at least one switching cell 110, $S_{mN}$ of the respective module 104, m into a configuration bypassing the at least one energy storage device 111, $C_{cell}$ and the auxiliary second power switches 114, $S_{mN+\_p}$; 115, $S_{mN-\_p}$; or: switching 315B the auxiliary second power switches auxiliary second power switches 114, $S_{mN+\_p}$; 115, $S_{mN-\_p}$ of the at least one switching cell 110, $S_{mN}$ of the respective module 104, m into a configuration bypassing the at least one energy storage device 111, $C_{cell}$ and the main second power switches 112, $S_{mN+\_p}$; 113, $S_{mN-\_p}$.

The power converter 1 may comprise a controller, processor or processing circuitry (not shown) configured to perform, conduct or initiate the various operations of the power converter 1 described herein. The processing circuitry may comprise hardware and/or the processing circuitry may be controlled by software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors.

The power converter 1 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the method 3 of operating the power converter 1 to be performed.

The present disclosure has been described in conjunction with various embodiments as examples as well as implementations. However, other variations can be understood and effected by those persons skilled in the art and practicing the claimed subject-matter, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A power converter, comprising:

at least one phase leg, comprising:

direct-current (DC) terminals connectable to a DC source or load;

an alternating-current (AC) terminal connectable to an AC load or source; and at least one module serially connecting the DC and AC terminals of the respective phase leg, the at least one module respectively comprising:

a first, a second, and a third AC terminal;

a first, a second, and a third DC terminal;

capacitive energy storage devices serially connecting the first, second, and third DC terminals;

at least one first power switch serially connecting the first DC terminal and the first AC terminal;

at least one switching cell serially connecting the second DC terminal and the second AC terminal, the at least one switching cell respectively comprising:

at least one energy storage device, and pairs of second power switches connected anti-serially, one of the pairs of the second power switches comprising main second power switches and another one of the pairs of the second power switches comprising auxiliary second power switches;

at least one (N≥1) third power switch serially connecting the third DC terminal and the third AC terminal;

wherein the first and third DC terminals of a first one of the at least one serially connected module forming the DC terminals of the respective phase leg, wherein the AC terminals of a last one of the at least one serially connected module connected to one another and forming the AC terminal of the respective phase leg, wherein the at least one first power switch and the at least one third power switch are respectively configured for synchronous switching based on first and third drive signals established in accordance with a first pulse-width modulation (PWM) scheme and in dependence of a predetermined AC voltage modulation waveform, and wherein the at least one switching cell is configured for asynchronous switching based on second drive signals established in accordance with a second PWM scheme and in dependence of the first and third drive signals, the asynchronous switching comprising:

switching the at least one switching cell of the respective module complementary to the drive signals of both the at least one first power switch and the at least one third power switch of the respective module, switching the main second power switches of the at least one switching cell of the respective module staggered in time in accordance with respective dwell times, and adjusting the respective dwell times to adjust the switching of the main second power switches.

2. The power converter of claim 1, the at least one switching cell of the respective module comprising:

a H-bridge, comprising:

two legs, respectively comprising a respective pair of the pairs of second power switches connected anti-serially;

a bridge between the two legs, comprising the at least one energy storage device of the at least one switching cell; and adjoining terminals of the two legs connected to form terminals of the at least one switching cell.

3. The power converter of claim 2, wherein the auxiliary second power switches have a current rating lower than a current rating of the main second power switches.

4. The power converter of claim 2, wherein the at least one energy storage device of the at least one switching cell of the respective module comprises a capacitive energy storage device.

5. The power converter of claim 4, wherein the at least one switching cell of the respective module further comprises a resistive device serially connected to the energy storage device of the at least one switching cell.

6. The power converter of claim 4, the at least one switching cell of the respective module further comprising an inductive energy storage device serially connected to one of the terminals of the at least one switching cell.

7. The power converter of claim 1, wherein each of the at least one first power switch of the respective module and the at least one third power switch of the respective module comprises at least one power diode.

8. The power converter of claim 1, wherein the at least one phase leg comprises three phase legs forming respective AC terminals connectable to a three-phase AC load or source.

9. A method of operating a power converter, wherein the power converter comprises:

at least one phase leg, comprising:

direct-current (DC) terminals connectable to a DC source or load;

an alternating-current (AC) terminal connectable to an AC load or source; and at least one module serially connecting the DC and AC terminals of the respective phase leg, the at least one module respectively comprising:

a first, a second, and a third AC terminal;

a first, a second, and a third DC terminal;

capacitive energy storage devices serially connecting the first, second, and third DC terminals;

at least one first power switch serially connecting the first DC terminal and the first AC terminal;

at least one switching cell serially connecting the second DC terminal and the second AC terminal, the at least one switching cell respectively comprising:

at least one energy storage device, and pairs of second power switches connected anti-serially, one of the pairs of the second power switches comprising main second power switches and another one of the pairs of the second power switches comprising auxiliary second power switches; and at least one (N≥1) third power switch serially connecting the third DC terminal and the third AC terminal;

wherein the first and third DC terminals of a first one of the at least one serially connected module forming the DC terminals of the respective phase leg; and wherein the AC terminals of a last one of the at least one serially connected module connected to one another and forming the AC terminal of the respective phase leg, the method comprising:

establishing first drive signals of the at least one first power switch of a respective module and third drive signals of the at least one third power switch of the respective module in accordance with a first pulse-width modulation (PWM) scheme and in dependence on a predetermined AC voltage modulation waveform;

establishing second drive signals of the at least one switching cell of the respective module in accordance with a second PWM scheme and in dependence on the first and third drive signals;

synchronously switching the at least one first power switch of the respective module based on the first drive signals;

synchronously switching the at least one third power switch of the respective module based on the third drive signals; and asynchronously switching the at least one switching cell of the respective module based on the second drive signals by:

switching the at least one switching cell of the respective module complementary to the drive signals of both the at least one first power switch and the at least one third power switch of the respective module, switching the main second power switches of the at least one switching cell of the respective module staggered in time in accordance with respective dwell times, and adjusting the respective dwell times to adjust the switching of the main second power switches.

10. The method of claim 9, the first PWM scheme comprising at least one of:

sinusoidal PWM (SPWM);

space vector PWM (SVPWM);

phase-shifted (PS) PWM; and/or phase disposition (PD) PWM.

11. The method of claim 9, the first PWM scheme comprising hybrid phase-shifted (PS) phase disposition (PD) PWM.

12. The method of claim 11, wherein the asynchronously switching the at least one switching cell of the respective module comprises switching the main second power switches of the at least one switching cell of the respective module complementary to the at least one first power switch or the at least one third power switch of the respective module having a same voltage blocking direction.

13. The method of claim 9, wherein adjusting the respective dwell times comprises:

sampling a voltage of the energy storage device;

comparing the sampled voltage with a reference voltage; and adjusting the respective dwell time so as to increase a charging time of the energy storage device based on the sampled voltage being greater than the reference voltage; or adjusting the respective dwell time so as to increase a discharging time of the energy storage device based on the sampled voltage being less than the reference voltage.

14. The method of claim 9, wherein adjusting the respective dwell times comprises: determining current direction and a voltage deviation direction of the energy storage device, the current direction defined as positive when the energy storage device is charged by a current upon insertion of the energy storage device between the second terminals of the respective module; adjusting the respective dwell time to a minimum value so as to reduce a total charge of the energy storage device based on the current direction being positive and the voltage deviation being positive or adjusting the respective dwell time to a maximum value so as to increase the total charge of the energy storage device based on the current direction being positive and the voltage deviation being negative.

15. The method of claim 9, further comprising switching the main second power switches of the at least one switching cell of the respective module into a configuration bypassing the at least one energy storage device and the auxiliary second power switches.

16. The method of claim 9, further comprising switching the auxiliary second power switches of the at least one switching cell of the respective module into a configuration bypassing the at least one energy storage device and the main second power switches.

17. The power converter of claim 1, wherein the asynchronous switching further comprises adjusting the respective dwell times, and wherein adjusting the respective dwell times comprises:

sampling a voltage of the energy storage device;

comparing the sampled voltage with a reference voltage; and adjusting the respective dwell time so as to increase a charging time of the energy storage device based on the sampled voltage being greater than the reference voltage; or adjusting the respective dwell time so as to increase a discharging time of the energy storage device based on the sampled voltage being less than the reference voltage.

18. A method of operating a power converter, wherein the power converter comprises:

at least one phase leg, comprising:

direct-current (DC) terminals connectable to a DC source or load;

an alternating-current (AC) terminal connectable to an AC load or source; and at least one module serially connecting the DC and AC terminals of the respective phase leg, the at least one module respectively comprising:

a first, a second, and a third AC terminal;

a first, a second, and a third DC terminal;

capacitive energy storage devices serially connecting the first, second, and third DC terminals;

at least one first power switch serially connecting the first DC terminal and the first AC terminal;

at least one switching cell serially connecting the second DC terminal and the second AC terminal, the at least one switching cell respectively comprising:

at least one energy storage device, and pairs of second power switches connected anti-serially, one of the pairs of the second power switches comprising main second power switches and another one of the pairs of the second power switches comprising auxiliary second power switches; and at least one (N≥1) third power switch serially connecting the third DC terminal and the third AC terminal;

wherein the first and third DC terminals of a first one of the at least one serially connected module forming the DC terminals of the respective phase leg; and wherein the AC terminals of a last one of the at least one serially connected module connected to one another and forming the AC terminal of the respective phase leg, the method comprising:

establishing first drive signals of the at least one first power switch of a respective module and third drive signals of the at least one third power switch of the respective module in accordance with a first pulse-width modulation (PWM) scheme and in dependence on a predetermined AC voltage modulation waveform;

establishing second drive signals of the at least one switching cell of the respective module in accordance with a second PWM scheme and in dependence on the first and third drive signals;

synchronously switching the at least one first power switch of the respective module based on the first drive signals;

synchronously switching the at least one third power switch of the respective module based on the third drive signals; and asynchronously switching the at least one switching cell of the respective module based on the second drive signals by:

switching the main second power switches of the at least one switching cell of the respective module complementary to the at least one first power switch or the at least one third power switch of the respective module having a same voltage blocking direction.

19. The method of claim 18, wherein asynchronously switching the at least one switching cell of the respective module comprises switching the main second power switches of the at least one switching cell of the respective module staggered in time in accordance with respective dwell times, the method further comprising adjusting the respective dwell times, wherein adjusting the respective dwell times comprises:

sampling a voltage of the energy storage device;

comparing the sampled voltage with a reference voltage; and adjusting the respective dwell time so as to increase a charging time of the energy storage device based on the sampled voltage being greater than the reference voltage; or adjusting the respective dwell time so as to increase a discharging time of the energy storage device based on the sampled voltage being less than the reference voltage.

* * * * *